M. H. McCLUER & A. C. MUNN.
AUTOMATIC FISHING REEL.
APPLICATION FILED APR. 9, 1912.
1,062,488.
Patented May 20, 1913.
2 SHEETS—SHEET 1.
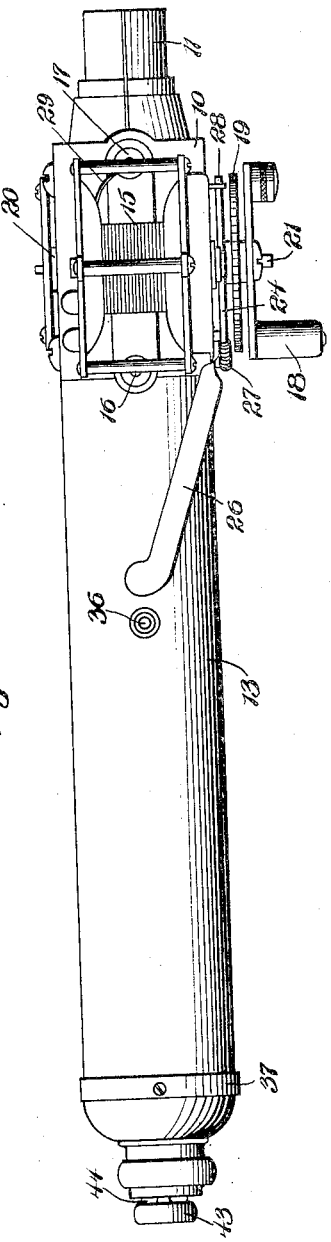
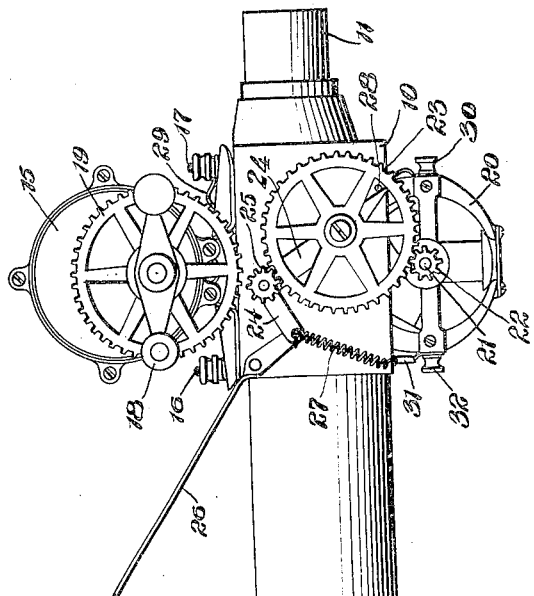
Inventors
Marshall H. McCluer.
Albert C. Munn.
By Victor J. Evans
Attorney
Witnesses
Wm. H. Mulligan, M. H. McCLUER & A. C. MUNN.
AUTOMATIC FISHING REEL.
APPLICATION FILED APR. 9, 1912.
1,062,488.
Patented May 20, 1913.
2 SHEETS—SHEET 2.
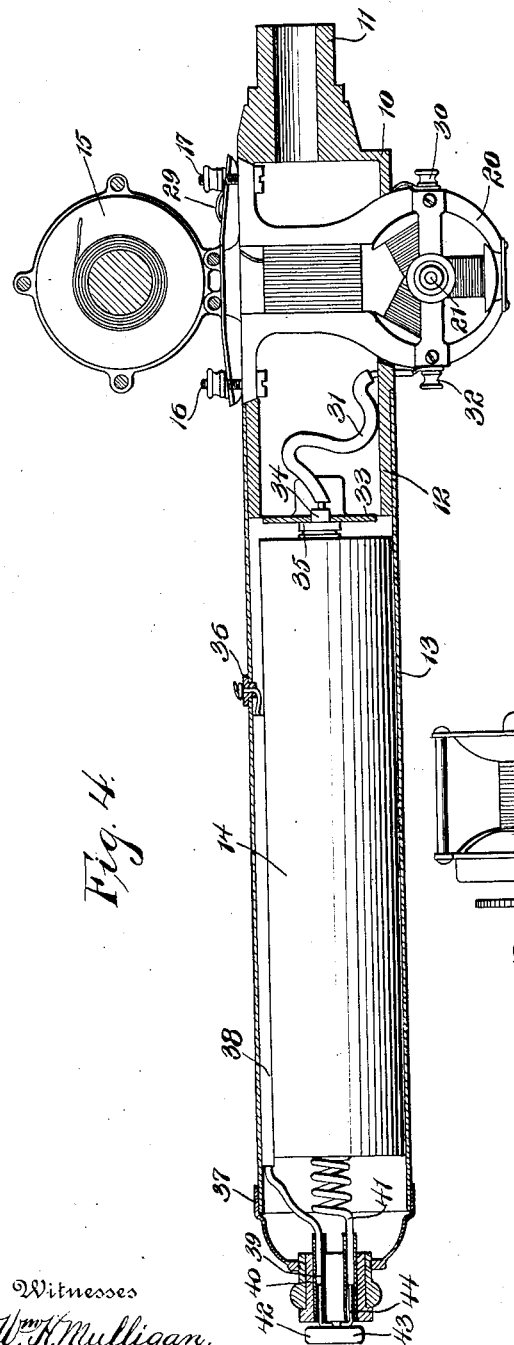
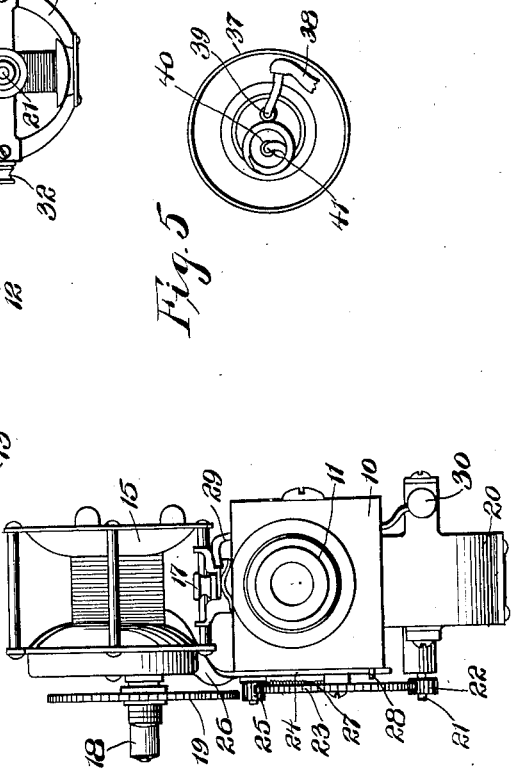
Witnesses
Inventor
Marshall H. McCluer
Albert C. Munn.
By Victor J. Evans.
Attorney

UNITED STATES PATENT OFFICE.

MARSHALL H. McCLUER AND ALBERT C. MUNN, OF MUSKEGON, MICHIGAN.

AUTOMATIC FISHING-REEL.

1,062,488.　　　　　Specification of Letters Patent.　　Patented May 20, 1913.

Application filed April 9, 1912.　Serial No. 689,466.

*To all whom it may concern:*

Be it known that we, MARSHALL H. MC-CLUER and ALBERT C. MUNN, citizens of the United States, residing at Muskegon, in the county of Muskegon and State of Michigan, have invented new and useful Improvements in Automatic Fishing-Reels, of which the following is a specification.

An object of the invention is to provide a reeling device for automatically operating a reel by electricity.

The invention embodies, more particularly, a device that is preferably adapted for use on a fishing pole or rod, the device being mounted on the rod and arranged for connection with the fishing reel, means being employed for simultaneously completing the connection between the motor mechanism of the device and the fishing reel and operating the motor mechanism.

In the further disclosure of the invention reference is to be had to the accompanying drawings forming a part of this specification, in which corresponding characters of reference denote like parts in all the views, and in which:

Figure 1 is a side elevation of a portion of a fishing pole showing our device mounted thereon, parts being broken away to disclose the underlying structure, and the dotted lines indicating the closed position of the operating lever; Fig. 2 is a plan view; Fig. 3 is an end elevation; Fig. 4 is a vertical longitudinal sectional view; and Fig. 5 is a view looking into the open end of the cap.

Referring more particularly to the views, use is made of a head 10, forming a part of a fishing pole, the forward end of the head terminating in a socket 11 adapted to receive a section of the pole, the rear end of the head terminating in a sleeve 12 encircled by an end of a handle 13 having mounted therein an electric battery 14. A reel 15 is mounted on the upper side of the head 10 and is secured to the head by a securing member 16 and a binding post 17, the said binding post being insulated from the head 10 and from a motor which will be hereinafter more fully disclosed. The reel is of the usual construction and provided with a handle 18, a toothed wheel 19 being secured to the shaft to which the handle 18 is secured and adapted to rotate therewith.

A motor 20 is mounted within the head 10 and projects from the under side thereof, the shaft 21 of the said motor being provided with a toothed wheel 22 in mesh with a toothed wheel 23 mounted to turn on the head 10. Mounted to swing on the head 10, and journaled thereon by the pin employed to journal the toothed wheel 23 on the head, is a bell crank lever 24 and mounted to turn on the bell crank lever is a pinion 25, an operating lever 26 being mounted on the head 10 and connected to an end of the bell crank lever 24, a contractile spring 27 being connected to the bell crank lever and to the head 10 and a pin 28 being mounted to extend from one side of the head 10 and adapted to be engaged by the lower end of the bell crank lever 24 to limit the swinging movement thereof.

A wire 29 is connected to the binding post 17 on the head 10 and extends downwardly to connect with a binding post 30 on the motor 20, a second wire 31 being connected to a binding post 32 on the motor and extending through the sleeve 12 to connect with a plate 33 mounted adjacent an end of the sleeve, the said plate being provided with a contact knob 34.

A contact knob 35 is formed at one end of the battery 14 and engages the contact knob 34 when the tubular handle 13 is mounted to encircle the sleeve 12, a contact knob 36 being mounted exteriorly of the handle and having connection with the battery 14, the mentioned contact knob 36 being adapted to be engaged by the free end of the lever 26.

A cap 37 is connected to the rear end of the handle 13 and the wire 38 is connected to the battery 14 and extends into the cap 37 to connect with a contact member 39 secured in a socket 40 mounted within the cap 37, a contact spring 41 being secured to the other contact member in the cap and adapted to engage the rear end of the battery 14 when the cap 37 is mounted on the handle 13. A circuit closing tip 42, comprising an insulated knob 43 and a fork shaped contact member 44, is provided for removable engagement with the cap 37, the ends of the contact member 44 being adapted to engage the contact member of the socket 40 to complete the circuit.

The electrical circuit for the motor is arranged to prevent short circuit between the battery and the motor and, therefore, various parts of the device described herein are insulated from the head 10. Now when the lever 26 is depressed to engage the contact knob 36 the circuit will be complete and current will be conveyed from the contact knob 36 through the lever 26 to the toothed wheel 25, which is insulated from the head 10, which engages the toothed wheel 19 to mesh therewith so that the current will pass through the toothed wheel and thence to the binding post 17, from which it is conveyed, by means of a wire 29, to the binding post 30, the wire 31 connecting the other binding post 32 of the motor with the member 34 being adapted to complete the circuit, it being understood that the contact spring 41 engages the rear end of the battery and, through the medium of the socket 40, conveys current through the wire 38 to the contact knob 36.

In the use of the device, when the usual fishing cord has been partially unwound from the reel 15 and it is desired to wind the cord thereon, the cord can be wound upon the reel in the usual manner by simply turning the handle 18 of the reel. If, however, it is desired to automatically wind the cord upon the reel, a downward pressure is exerted on the lever 26 to engage the outer end of the lever with the contact knob 36, thus completing the circuit from the battery to the motor and operating the motor, it being readily understood that when the lever 26 is moved downwardly, the bell crank lever 24 will be operated against the action of the spring 27 to move the pinion 25 thereon into mesh with the toothed wheel 19 and the toothed wheel 23, thus through the medium of the toothed wheels 19 and 23 and the pinion 25, imparting motion to the reel 15 to wind the cord thereon, the operation of starting the motor with the current from the battery 14 and operating the reel to wind the fishing cord thereon being accomplished when the lever 26 is moved downwardly to engage the contact knob 36.

If for any reason the battery 14 in the handle 13 should become weak or unfit to supply sufficient current to the motor 20, the tip 42 can be removed from engagement with the cap 37 and the wires can be quickly connected with the socket 40 in the cap 37, the other ends of the wires being connected with suitable batteries arranged in the boat or other suitable place.

Having thus described our invention, we claim:

1. In a reeling device, the combination with a head, of a reel mounted thereon, a motor mounted on the head and connected with a battery, and an operating lever mounted to swing on the head and movable to simultaneously connect the said motor with the said reel and close the circuit from the said battery to the said motor.

2. In a reeling device, the combination with a head, of a tubular handle for connection therewith, a battery mounted in the said handle, a motor mounted on the head and connected with the said battery, a reel mounted on the said head, and means for simultaneously connecting the said motor with the said reel and closing the circuit from the said battery to the said motor.

3. In a reeling device, the combination with a head, of a motor mounted thereon, a reel mounted on the head, a battery connected with the said motor, means for simultaneously connecting the said motor with the said reel and closing the circuit from the said battery to the said motor, a cap for connection with the said battery, contact members mounted in the said cap and connected with the battery, and a contact tip for removable engagement with the cap to close the circuit to the said battery.

In testimony whereof we affix our signatures in presence of two witnesses.

MARSHALL H. McCLUER.
ALBERT C. MUNN.

Witnesses:
THOMAS FINCH,
JAMES MILLARD.